(12) United States Patent
Smith et al.

(10) Patent No.: US 9,381,847 B2
(45) Date of Patent: Jul. 5, 2016

(54) BELLY DUMP TRAILER

(71) Applicants: Danny S. Smith, Drayton Valley (CA); Gregory A. Hartman, Drayton Valley (CA)

(72) Inventors: Danny S. Smith, Drayton Valley (CA); Gregory A. Hartman, Drayton Valley (CA)

( * ) Notice: Subject to any disclaimer, the term of this patent is extended or adjusted under 35 U.S.C. 154(b) by 0 days.

(21) Appl. No.: 14/720,157

(22) Filed: May 22, 2015

(65) Prior Publication Data

US 2015/0336496 A1    Nov. 26, 2015

(30) Foreign Application Priority Data

May 26, 2014 (CA) ...................................... 2852430
Dec. 22, 2014 (CA) ...................................... 2876681

(51) Int. Cl.
 *B60P 1/56* (2006.01)
(52) U.S. Cl.
 CPC ........................................ *B60P 1/56* (2013.01)
(58) Field of Classification Search
 CPC ........................................................ B60P 1/56
 USPC ............... 298/25, 27, 29, 30, 33, 35 R, 35 M; 105/240, 253–255, 286
 See application file for complete search history.

(56) References Cited

U.S. PATENT DOCUMENTS

| 1,092,659 | A |   | 4/1914  | Mettler |
| 3,169,491 | A | * | 2/1965  | Darlington et al. ........ 298/35 M |
| 3,515,076 | A |   | 6/1970  | Aquino |
| 3,625,159 | A |   | 12/1971 | Radey |
| 3,789,772 | A |   | 2/1974  | Bullard |

OTHER PUBLICATIONS ebay, "dump trailer wireless remote control ez dumper bri mar controller," retrieved from http://www.ebay.com/sch/sis.html?_nkw=dump+trailer+wireless+remote+control+ez+dump&_trksid=p2047675.m4100 on Mar. 25, 2014, 2 pages.
Images of Belly Dump trailer taken Jun. 2014, 14 pages.
Last Frontier Trailers, "Last Frontier Trailers," retrieved from http://www.alaskaatvtrailers.com/ on Mar. 5, 2014, 2009, 1 page.
ShirAul, LLC, "Aluminum Bottom Dump," Product Brochure, 2013, pp. 1-2.
Trailblazer ATV Trailers Manufacturing and Sales, "Belly Dump," retrieved from www.atvtrailerspro.com/Belly_Dump.html on Mar. 5, 2014, 2009, 1 page.

* cited by examiner

*Primary Examiner* — Stephen Gordon
(74) *Attorney, Agent, or Firm* — Seed IP Law Group PLLC

(57) ABSTRACT

A belly dump trailer has a hopper having a bottom gate and a mobile support frame. The belly dump trailer is supported by wheels which may be in a dual axle configuration. The bottom gate is rotated between an open and closed position to discharge a load of materials within the hopper. The bottom gate is driven by a rotary drive connected to the bottom gate by an over center cam lock formed of pivotally connected link arms. The opening and closing of the bottom gate is driven by a pair of pneumatic linear actuators. The bottom gate may be positioned in between the two axles of the dual axle configuration.

7 Claims, 11 Drawing Sheets

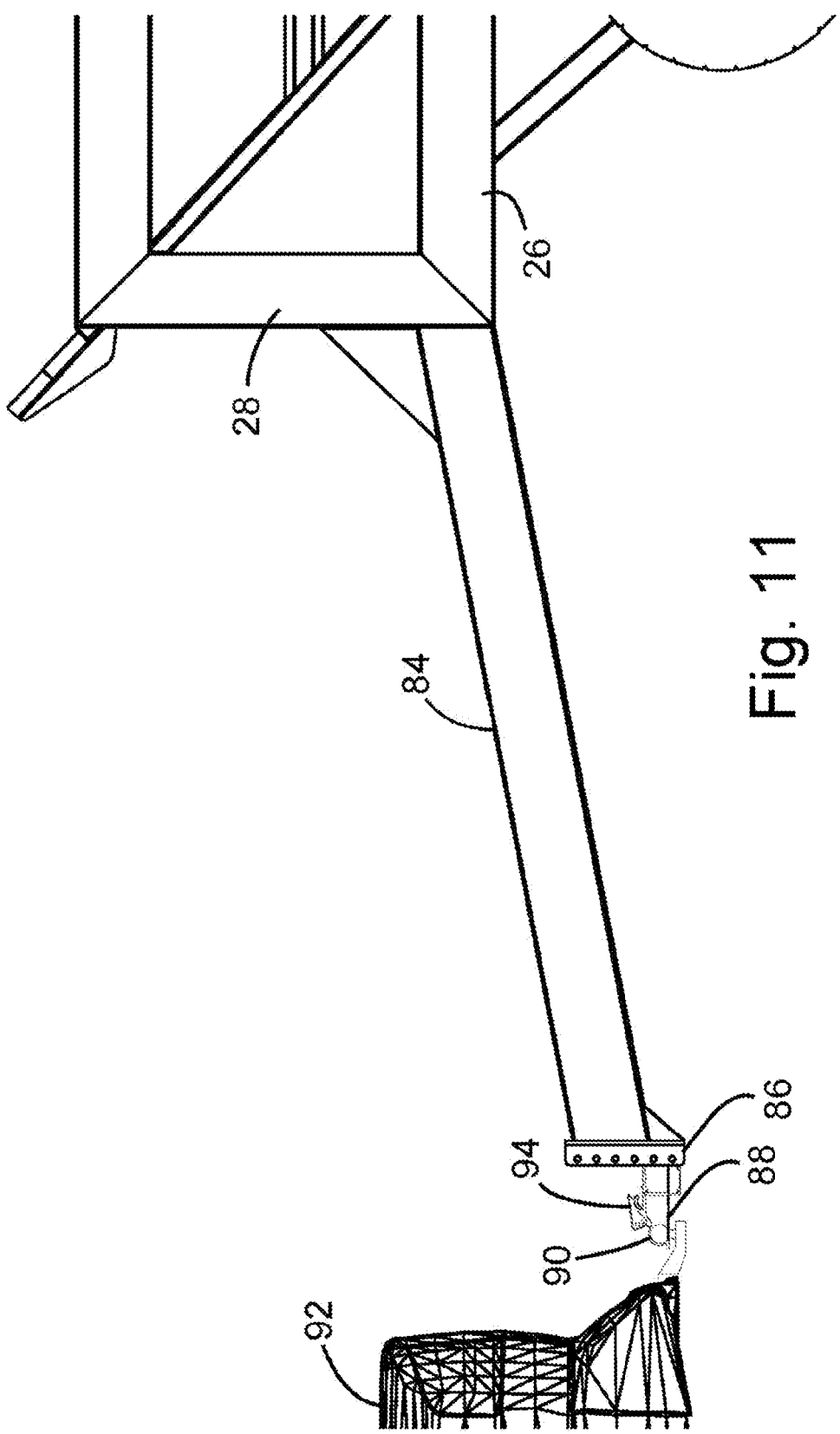

BELLY DUMP TRAILER

BACKGROUND

1. Technical Field

This disclosure pertains to belly dump trailers.

2. Description of the Related Art

Belly dump trailers have increased in popularity compared with end dump or side dump trailers due to the ease of disposing of a load. Belly dump trailers have a pivoting dump gate that opens to release the contents of the belly dump. Belly dump trailers that are towed by heavy duty trucks may be frame supported, or the dump box or tub might itself form the structure of the trailer. There also exist belly dump trailers that are drawn by all terrain vehicles. Some dump trailers are used on acreages, well sites, or other locations where there is a narrow space for turning vehicles, where the ground is sensitive to heavy trucks and/or where there are overhead lines that might be contacted by an end dump trailer. At the same time, it is desirable to have a relatively heavy load in the dump trailer.

BRIEF SUMMARY

There is proposed a new form of belly dump trailer. There is disclosed a belly dump trailer suitable for towing with a fifth wheel unit such as a pickup truck, and there is also disclosed a belly dump trailer that has a simple and effective mechanism for activating and holding closed the belly dump gate.

In an embodiment, a belly dump trailer is provided having a hopper having a bottom gate, wheels supporting the hopper, the bottom gate being hinged to rotate about a horizontal axis between a closed position and an open position, a rotary drive for rotating the bottom gate between the closed position and open position, the rotary drive being connected to the bottom gate by an over center cam lock formed of pivotally connected link arms comprising a first link arm and a second link arm.

In various embodiments, there may be included any one or more of the following features: in the rotary drive, the first link arm is connected to the bottom gate at a first pivot offset from the horizontal axis and to the second link arm at a second pivot, the closed position of the bottom gate corresponding to the first link arm and the second link arm at a first non-zero angle to each other and forced against a stop, with opening of the bottom gate corresponding to movement of the first link arm and second link arm through a position in which the first link arm and second link arm are parallel to a position in which the first link arm and second link arm are at a second non-zero angle to each other; the second link arm is secured for rotation about a third pivot, and is driven in operation around the third pivot by a pair of pneumatic linear actuators; the pair of pneumatic linear actuators are connected by rods to respective off center connections on a drive axle, and the drive axle is connected to drive the second link arm through a third link arm; the hopper is supported on the wheels by a frame that includes a base frame member, and all components of the rotary drive are support on the base frame member; the wheels comprise a forward axle and rearward axle mounted under the base frame member with the bottom gate mounted between the forward axle and the rearward axle; the frame terminates forwardly in a gooseneck; the gooseneck comprises a fifth wheel attachment part; the fifth wheel attachment part comprises a fifth wheel pin; the rotary drive is remotely controlled; the base frame member extends forward of the forward axle; and the forward part of the frame comprises a bumper pull attachment part.

In an embodiment, there is provided a belly dump trailer having a frame supporting a hopper, the hopper having a bottom gate, the frame terminating forwardly in a gooseneck, the frame being supported rearwardly by a forward axle and rearward axle mounted under the base frame member and a fifth wheel pin depending from the gooseneck. The bottom gate may be mounted between the forward axle and the rearward axle.

These and other aspects of the device and method are set out in the claims, which are incorporated here by reference.

BRIEF DESCRIPTION OF THE SEVERAL VIEWS OF THE DRAWINGS

Embodiments will now be described with reference to the figures, in which like reference characters denote like elements, by way of example, and in which:

FIG. 11 is a side view of the belly dump trailer of FIG. 10.

DETAILED DESCRIPTION

Immaterial modifications may be made to the embodiments described here without departing from what is covered by the claims.

Figure 1:
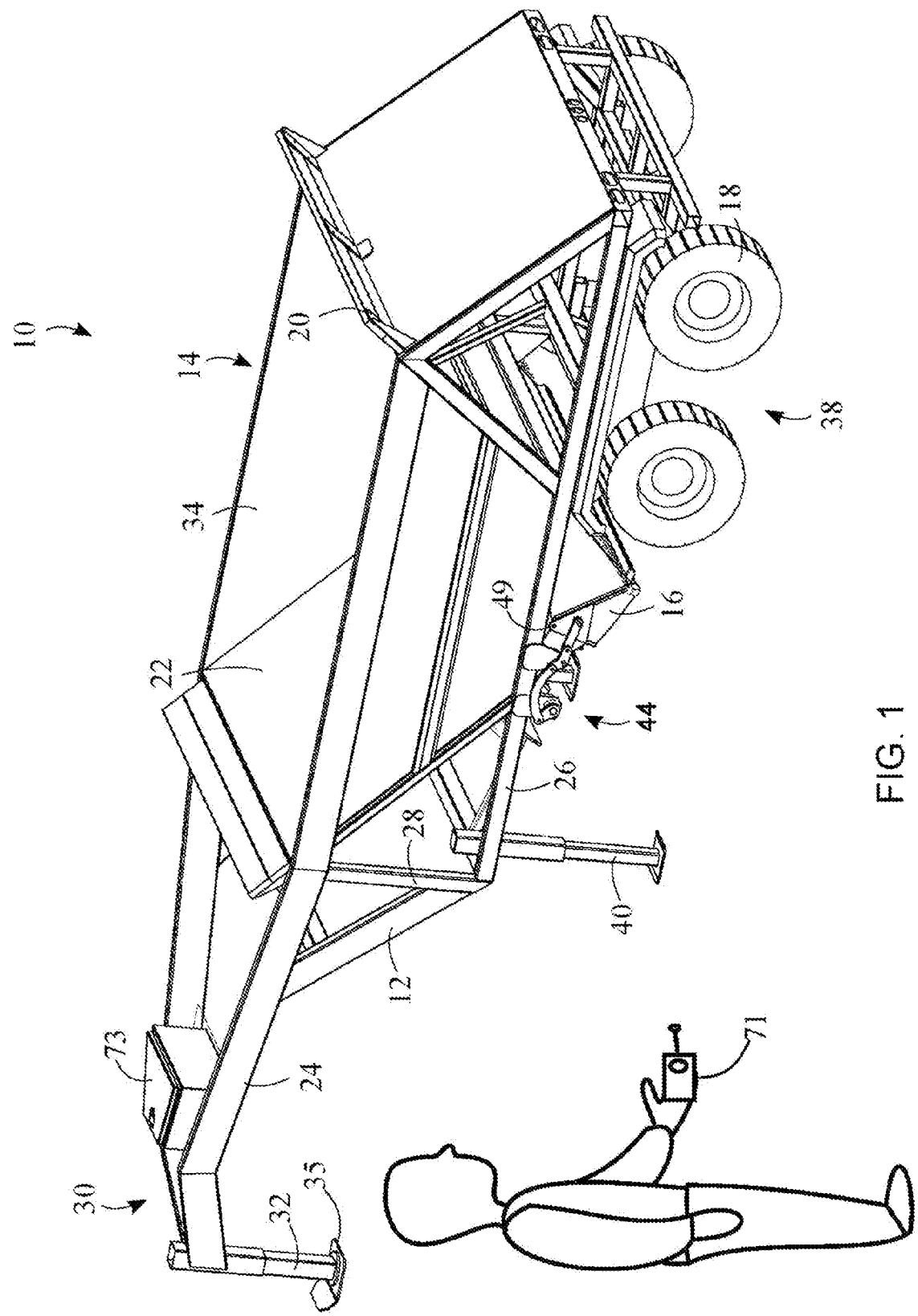
FIG. 1 is a first perspective view of an embodiment of a belly dump trailer.
Figure 2:
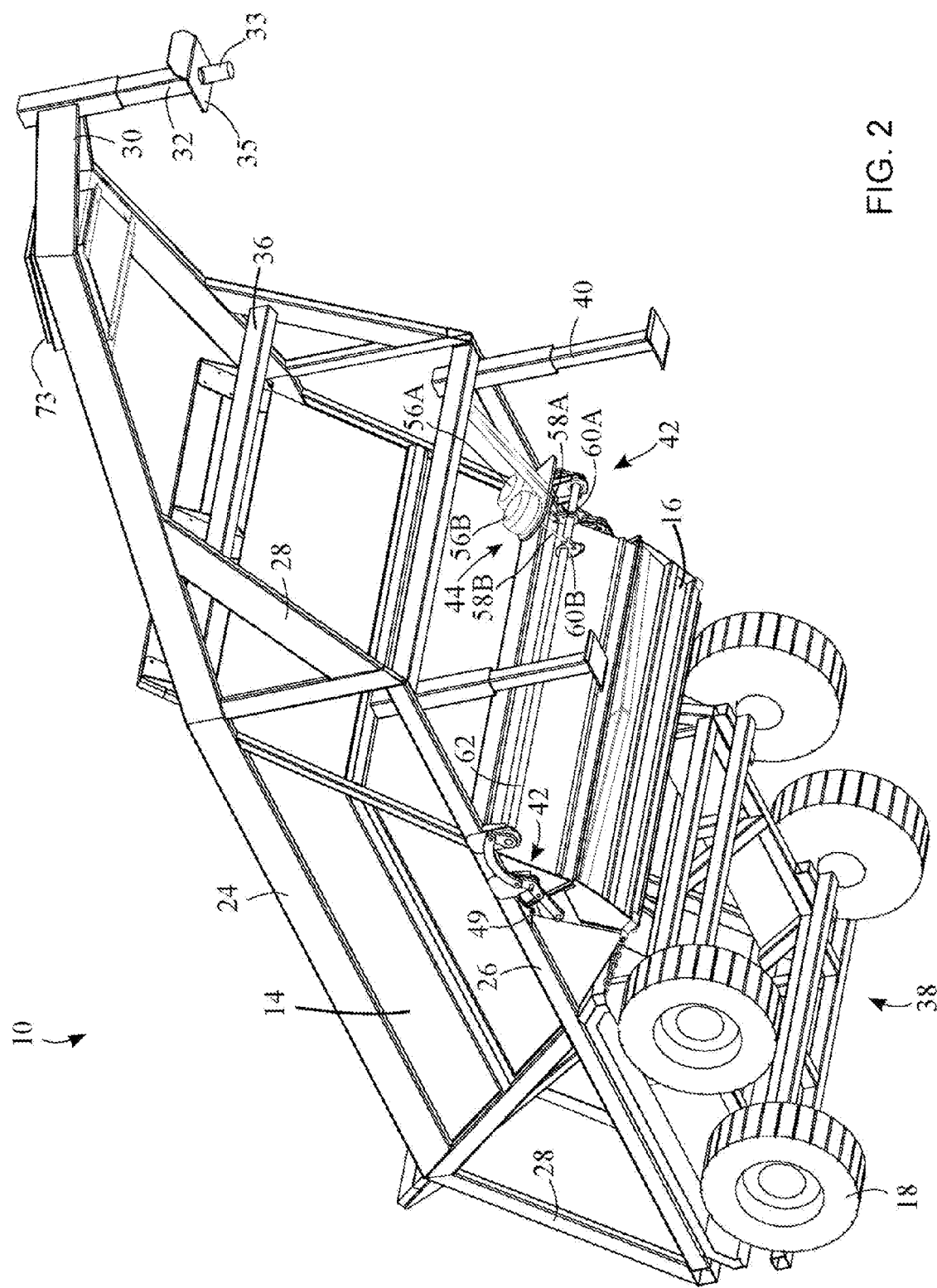
FIG. 2 is a second perspective view of the belly dump trailer of FIG. 1.

Referring to FIGS. 1 and 2, there is shown an embodiment of a belly dump trailer 10 comprising a hopper 14 having a bottom gate 16 supported by wheels 18. The wheels are preferably connected to and underlie a mobile support frame 12 that includes an upper frame member 24 and base frame member 26. Side frame members 28 may extend between the upper and base frame member. Frame 12 terminates forwardly in a gooseneck 30. The gooseneck 30 may comprise a fifth wheel attachment part 32 that permits the belly dump trailer to be attached to a towing vehicle, for example a pickup truck. The fifth wheel attachment part 32 may be any suitable attachment part for attaching a trailer to a fifth wheel hitch or a bed of the towing vehicle, for example using a fifth wheel pin 33 depending from the gooseneck 30. The fifth wheel attachment part 32 may include a conventional fifth wheel pin 33 with guide plate 35 for engaging the fifth wheel receiver.

Hopper 14 may have four walls joined to form a holding compartment, the rear wall 20 and front wall 22 being angled so that the base is narrower than the top so that the material in the hopper will tend to flow towards the bottom gate 16. The side walls 34 may extend between the front wall and the rear wall, and from the upper frame member 24 to the base frame member 26, and the walls may extend above the upper frame member and below the base frame member. Each of the four walls extends downwardly to a discharge opening 82 at the bottom of the hopper (shown in FIG. 4) which may be closed with bottom gate 16. The rear wall and the front wall may each be supported near the top of the wall by a rear upper cross frame bar (not shown) and a front upper cross frame bar 36 respectively. The frame may have an additional top frame member above the upper frame member in order to support taller hopper walls. The hopper may be made of any suitable material.

Figure 3:
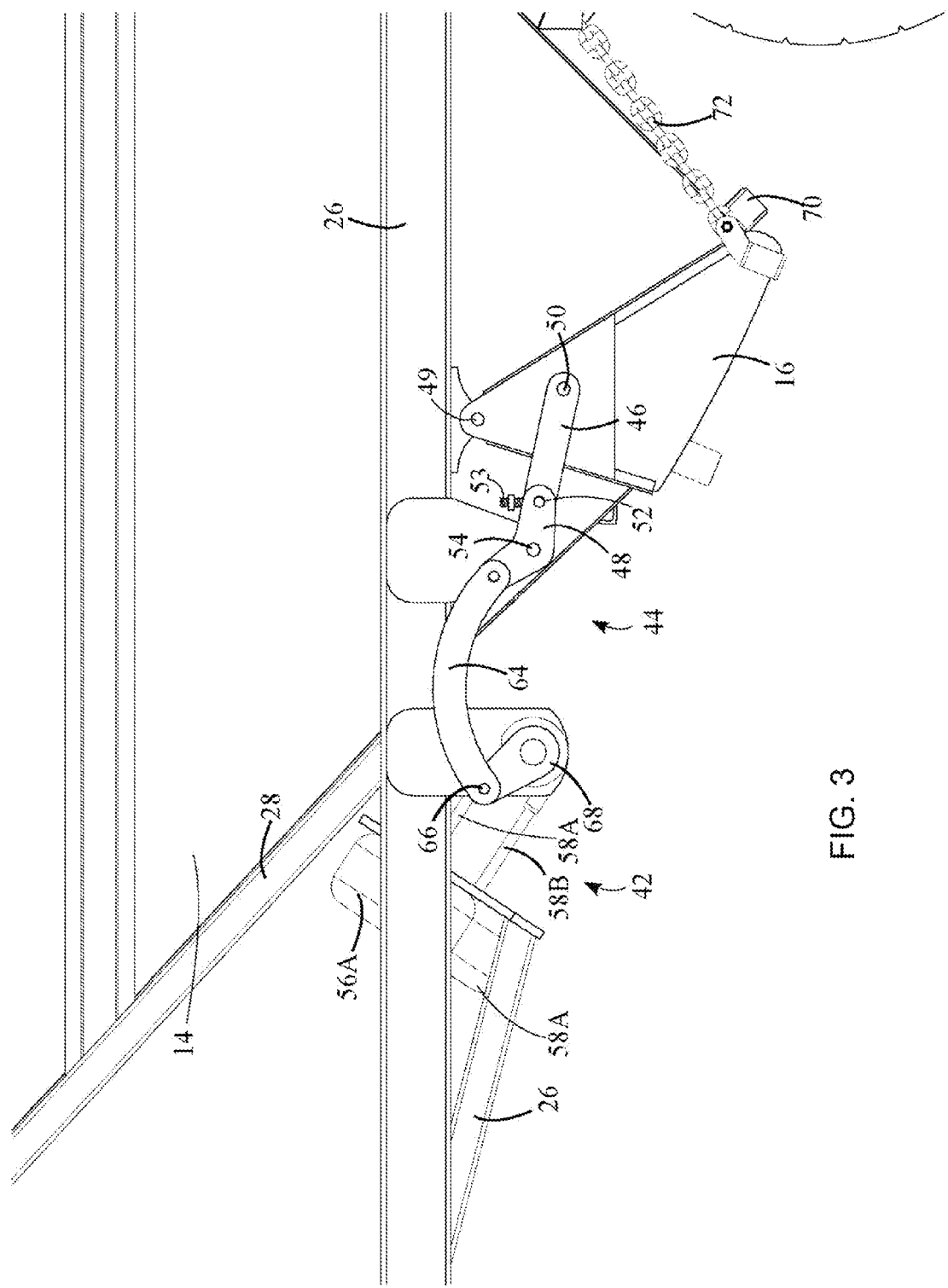
FIG. 3 shows an embodiment of an over center cam lock to operate a bottom gate of the belly dump trailer of FIG. 1.
Figure 4:
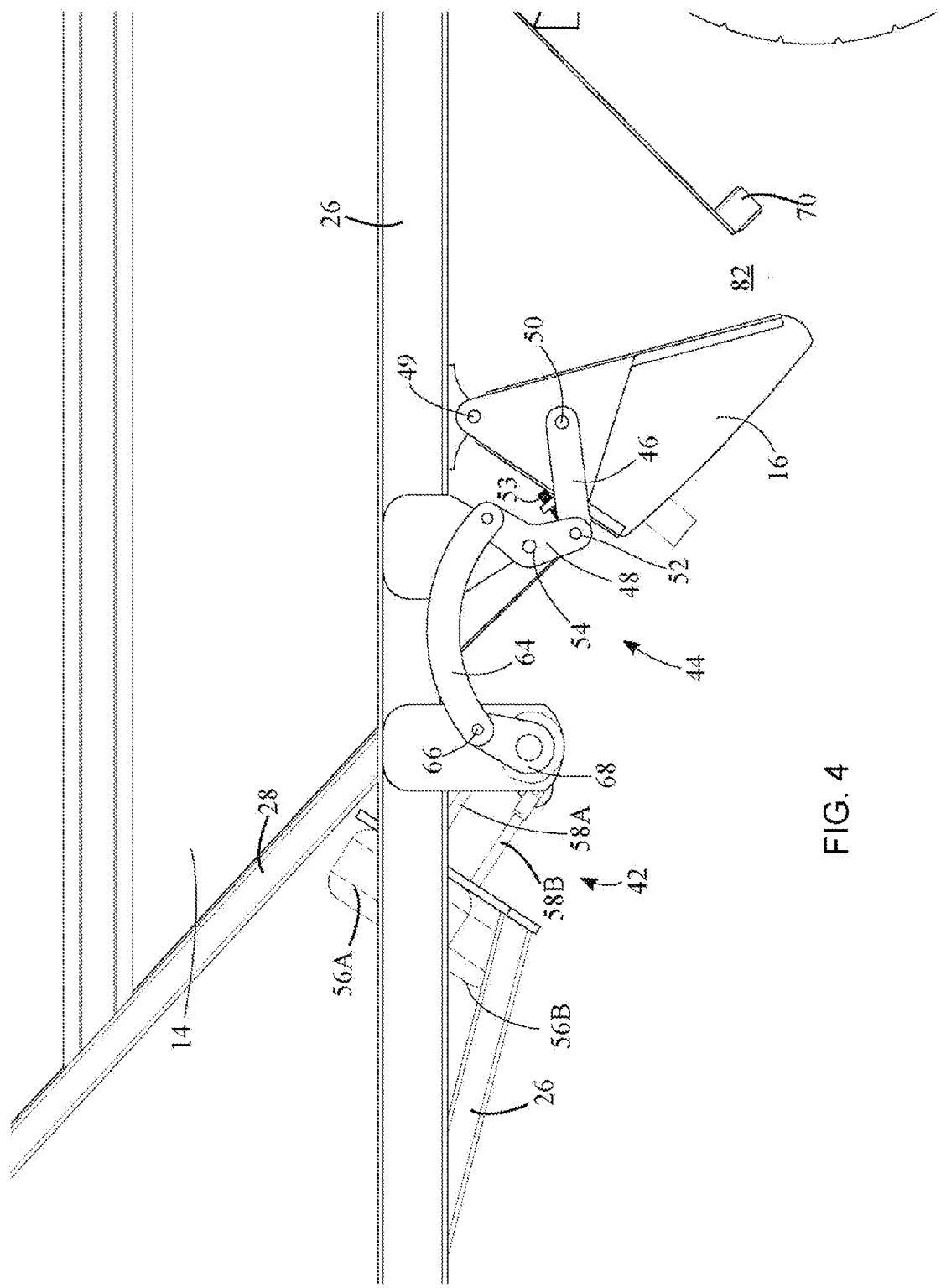
FIG. 4 shows an embodiment of the belly dump trailer of FIG. 1 with the bottom gate in an open position.

Bottom gate 16 is hinged to rotate about a horizontal axis 49 between a closed position (FIG. 3) and an open position (FIG. 4). Bottom gate 16 regulates the discharge of the materials through the discharge opening and opens to evenly unload the materials with gravity to the ground or other surface below the hopper. When in the closed position, the bottom gate 16 completely covers the discharge opening. The discharge opening is preferably at the lowest point of the hopper 14 to ensure all materials may be discharged through the discharge opening. The bottom gate 16 may be shaped so that when the bottom gate is in the closed position the bottom gate 16 may extend over the discharge opening and the lower portions the four walls of the hopper. Bottom gate 16 preferably opens towards the rear of the belly dump trailer. The materials may be discharged while the vehicle is in motion or stationary. The hopper 14 is typically open at the top to allow materials, for example gravel or dirt, to be loaded into the hopper, and may hold for example 6 cubic yards of materials.

The frame 12 may be supported rearwardly by wheels in a dual axle configuration 38. The dual axle configuration may be mounted under the base frame member 26. The dual axle configuration may be a dual rear axle. The frame 12 may be supported forwardly by front adjustable jacks 40 that rest on the ground or a surface below the belly dump trailer and support the belly dump trailer while it is not attached to a towing vehicle.

Figure 7:
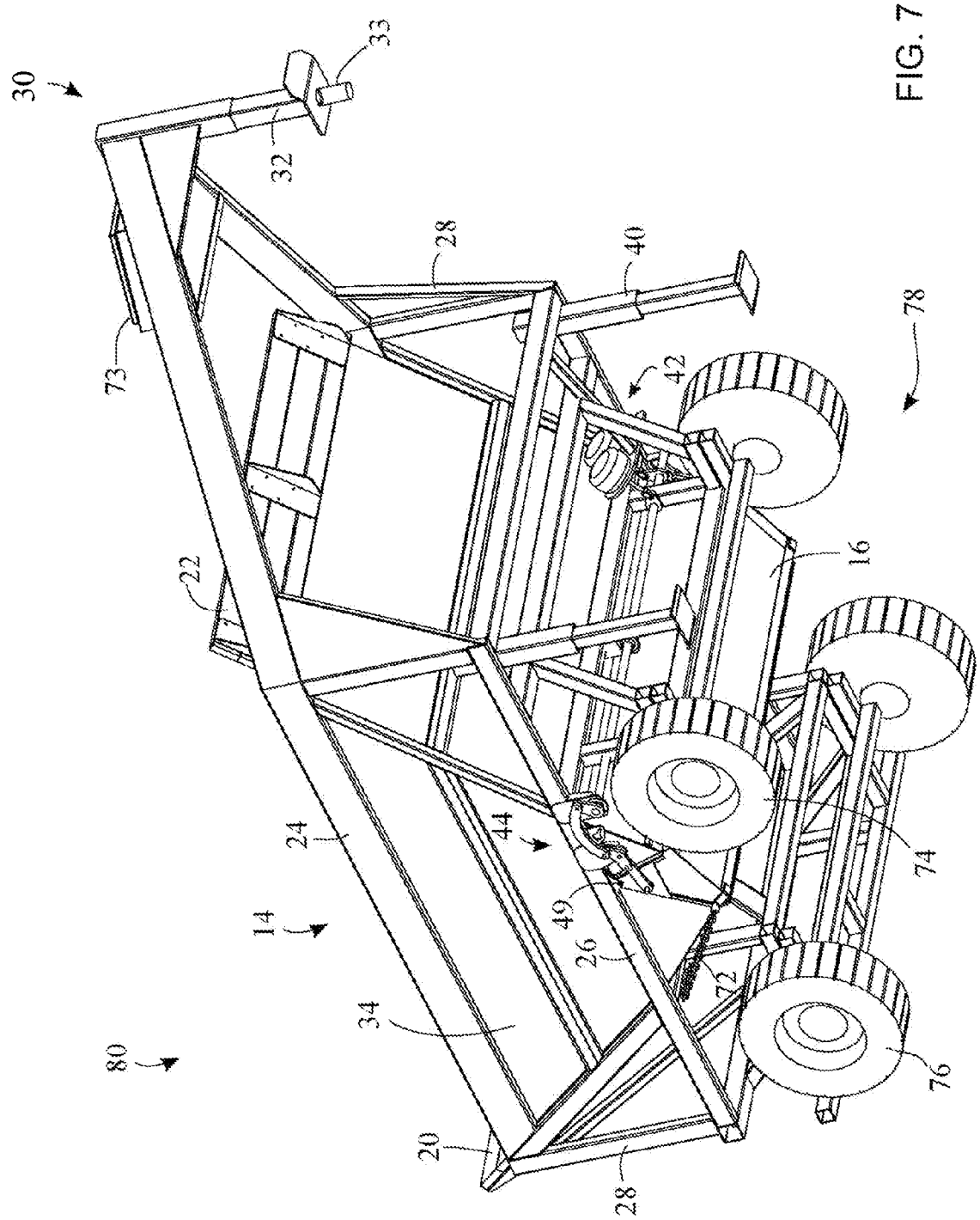
FIG. 7 is a first perspective view of the belly dump trailer of FIG. 6

The bottom gate 16 is preferably rotated about axis 49 between the closed position, shown in FIG. 3, and the open position, shown in FIG. 4, by a rotary drive 42 connected to the bottom gate by an over center cam lock 44. The over center cam lock may be formed of pivotally connected link arms comprising a first link arm 46 and a second link arm 48. The first link arm may be connected to the bottom gate at a first pivot 50 offset from the horizontal axis. The first link arm may be connected to the second link arm 48 at a second pivot 52. When the bottom gate is in the closed position, the first link arm and the second link arm may be at a first small non-zero angle to each other (FIG. 3) and may be forced against a stop 53 or prevented from further movement by the inactive position of actuators 56A, 56B. The stop 53 may comprise a threaded bolt with lock nut welded or otherwise attached to the frame 12 near the pin 54 so that the stop position may be adjusted. When the stop 53 is engaged by the links moving upward, the bottom gate 16 is prevented from opening. To open the bottom gate the first link arm 46 and second link arm 48 may move through a position in which the first link arm 46 and second link arm 48 are parallel to a position in which the first link arm 46 and second link arm 48 are at a second non-zero angle to each other. In the embodiment shown, the second non-zero angle (FIG. 4) is greater than the first non-zero angle (FIG. 3). The second link arm may be secured for rotation about a third pivot 54. The drive mechanism shown in FIGS. 3 and 4 is preferably also supplied at the other side of the hopper 14 as shown in FIGS. 2 and 7.

The bottom gate 16 may be additionally held in place in the closed position by chain 72. Chain 72 may be removed to allow the bottom gate to be moved into the open position. The closed position of the bottom gate may be defined by a bar acting as a stop 70 on the outside surface of the rear wall of the hopper.

Figure 5:
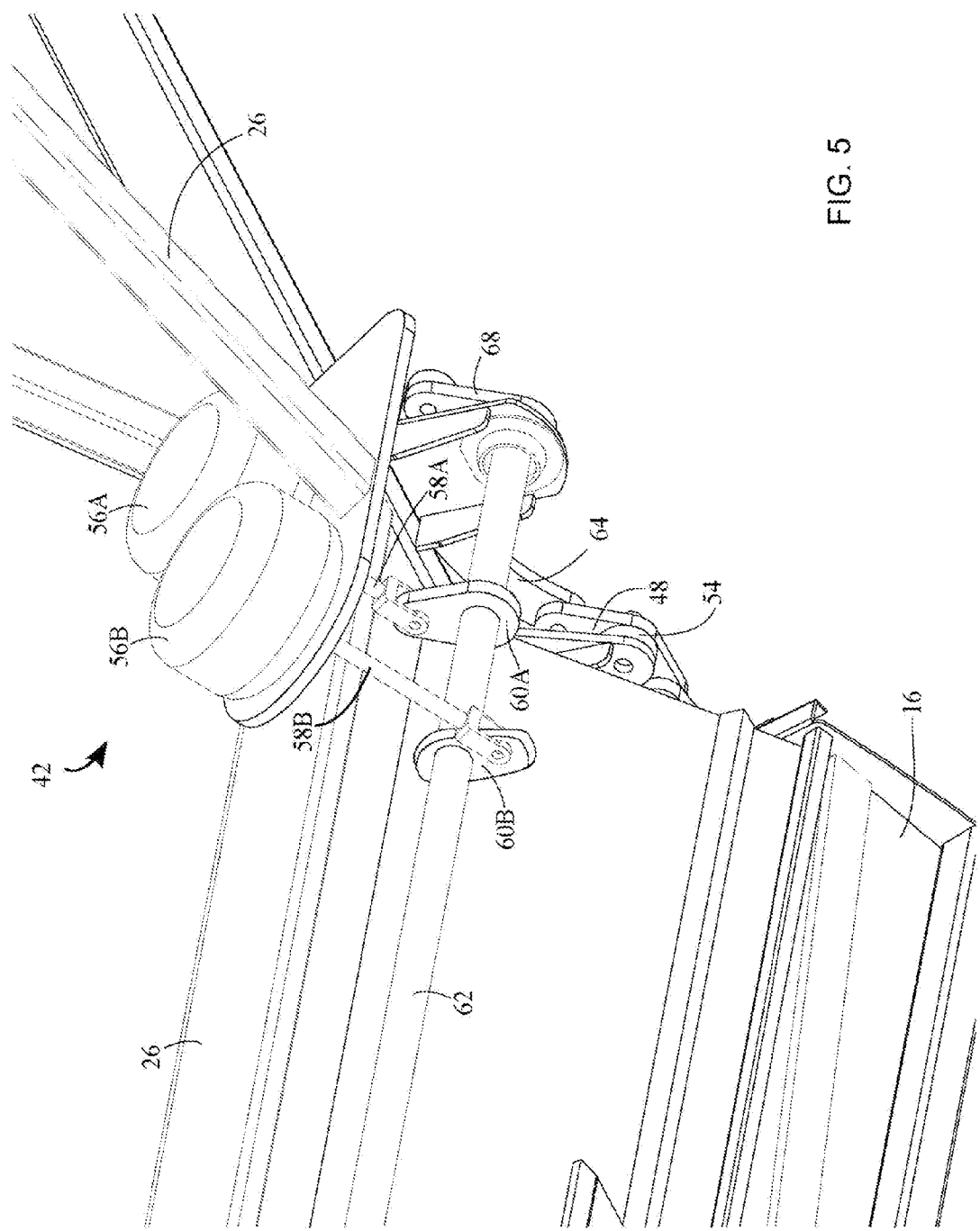
FIG. 5 shows an embodiment of a rotary drive to drive the operation of the bottom gate of the belly dump trailer of FIG. 1.
Figure 6:
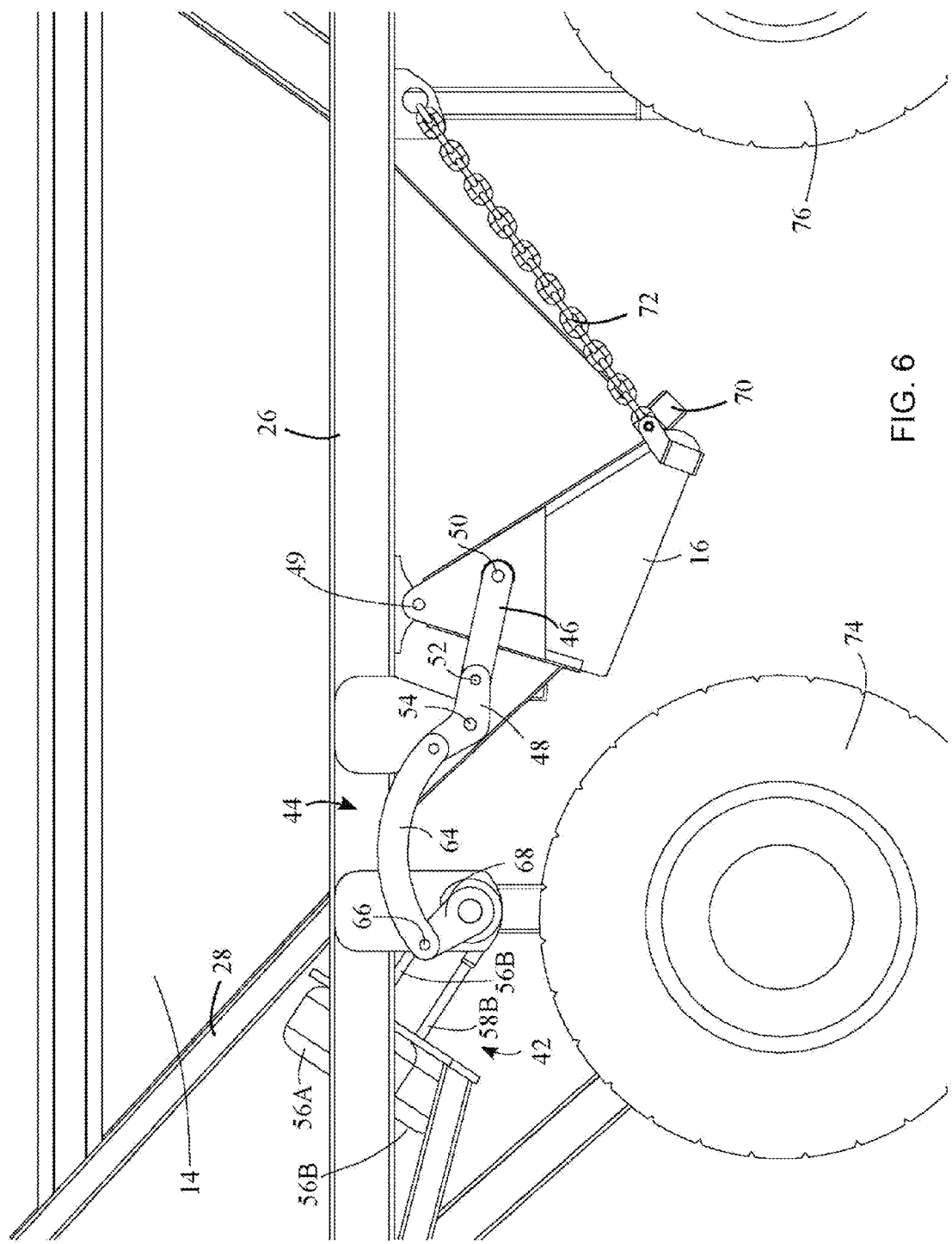
FIG. 6 is a side view of the bottom gate of an embodiment of a belly dump trailer where the hopper is positioned in between the two axles.

Referring to FIG. 5, the opening and closing of the bottom gate may be driven by a pair of pneumatic linear actuators 56A, 56B. The actuators 56A, 56B may be for example single acting brake pots. The pneumatic linear actuators may drive the second link arm in operation around the third pivot. The pneumatic linear actuators 56A, 56B may be connected by rods 58A, 58B respectively through respective off center connections or cams 60A, 60B on a drive axle 62 that may be connected to drive the second link arm through a third link arm 64. Third link arm 64 may be pivotally connected to an arm 68 on the end of the drive axle around a fourth pivot 66. One of the pair of pneumatic linear actuators operates to open the bottom gate, and the other of the pair of pneumatic linear actuators operates to close the bottom gate.

In the closed position shown in FIG. 3, actuation of one of the rods, here rod 58A, by the actuator 56A rotates the off center connection 60A clockwise. Clockwise rotation of the off center connection 60A causes the drive axle 62 and arm 68 to rotate clockwise, and the link arm 64 moves to the right in the figure and causes arm 48 to rotate clockwise about pivot 54. Rotation of arm 48 clockwise about pivot 54 causes link arm 46 to move counterclockwise from the closed position against stop 53 to the open position shown in FIG. 4. In the open position shown in FIG. 4, actuation of on of the rods, here rod 58B, by the actuator 56B rotates the off center connection 60B counterclockwise. Counterclockwise rotation of the off center connection 60B causes the drive axle 62 and arm 68 to rotate counterclockwise, and the link arm 64 moves to the left in the figure and causes arm 48 to rotate counterclockwise about pivot 54. Rotation of arm 48 counterclockwise about pivot 54 causes link arm 46 to move clockwise from the open position to the closed position against stop 53 shown in FIG. 3. The angle between the two off center connections 60A and 60B may be set to accommodate the required degree of rotation of the link 68, so that as one connection is pushed, the other returns to a position ready to be pushed again.

Referring to FIGS. 6-9, the frame may be supported by wheels in a dual axle configuration 78 where the axles are spaced apart so that the hopper 14 is positioned in between the two axles and bottom gate 16 is between front wheels 74 and rear wheels 76. The over the center cam lock 44 may be positioned to the rear of the front wheels 74.

Figure 8:
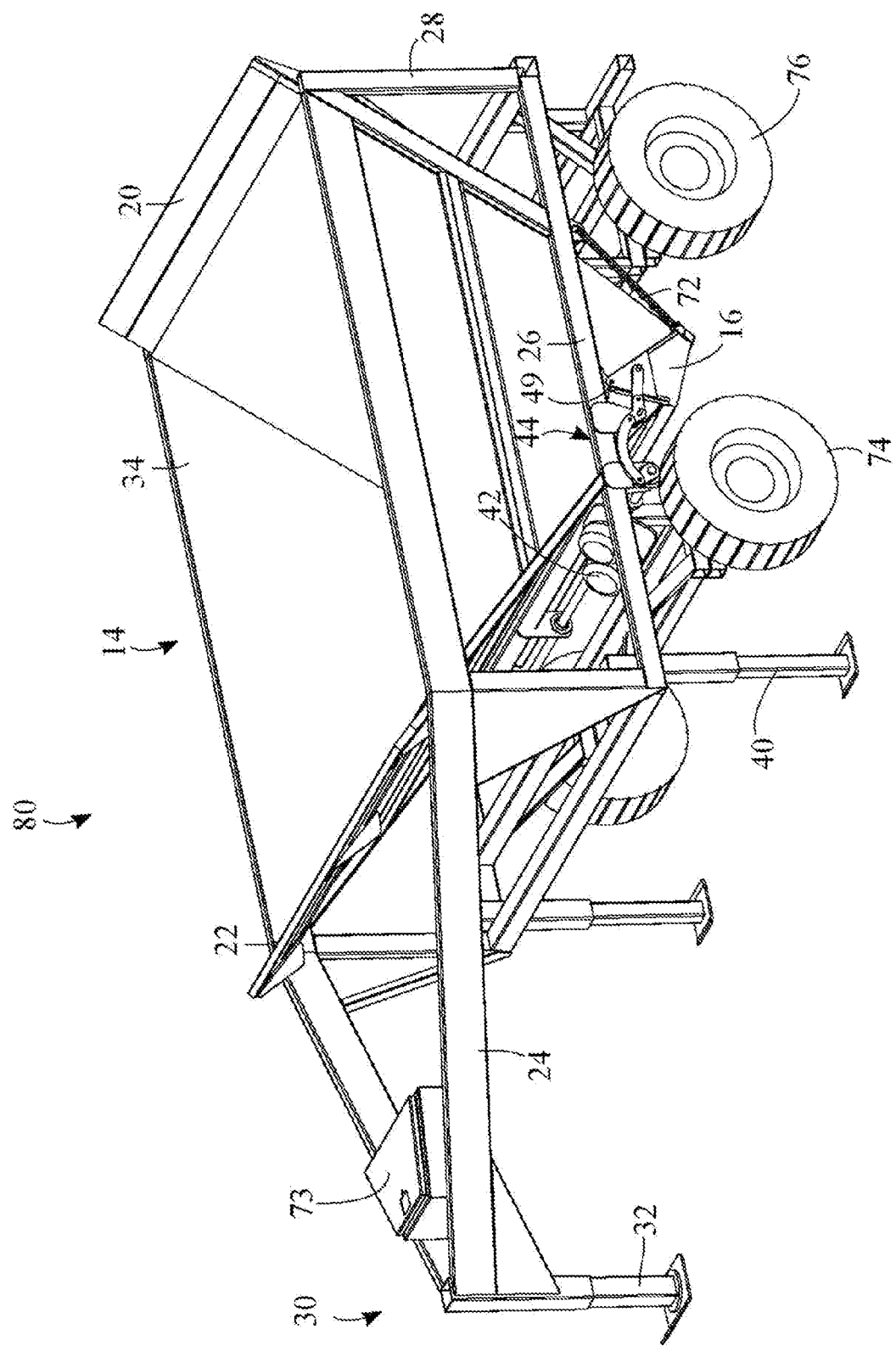
FIG. 8 is a second perspective view of the belly dump trailer of FIG. 6.
Figure 9:
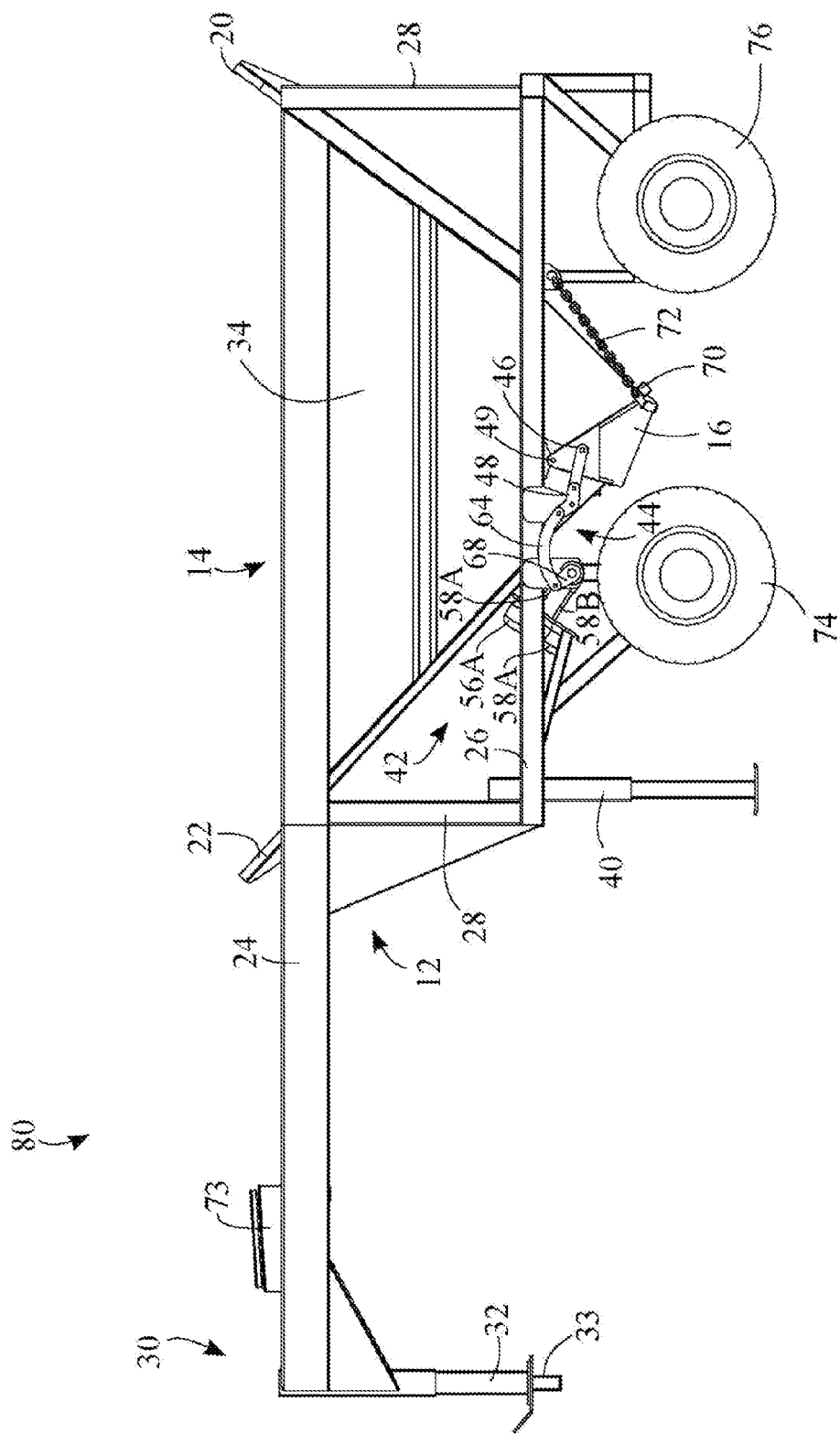
FIG. 9 is a side view of the belly dump trailer of FIG. 6.

The forward part of the upper frame 24 may have a downward bend as shown in FIGS. 1 and 2 or may be substantially straight as shown in FIGS. 7-9.

There may be multiple over the center cam locks, for example two where an over the center cam lock is attached to each end of the bottom gate. The multiple over the center cam locks may be connected to either end of the drive axle and driven by the same pair of pneumatic linear actuators.

All of the components of the rotary drive may be supported on the base frame member. The rotary drive may be remotely controlled, for example by a remote control 71 carried by an operator of the vehicle (not shown, but could be a pickup truck or other truck with a fifth wheel attachment) that is used to tow the belly dump. The remote control 71 operates the two pneumatic actuators 56A, 56B via a gas drive 73 with included radio interface (not shown separately) that connects via air lines (not shown) to the actuators 56A, 56B. One button on the remote control may be used to open the bottom gate by actuation of a first one of the actuators and another button on the remote control may be used to close the bottom gate by actuation of the other of the actuators. The gas drive contains compressed gas to operate the actuators 56A, 56B. Other gas drives, hydraulic devices or electrical devices such as electrical motors may be used for the actuators in some embodiments.

Figure 10:
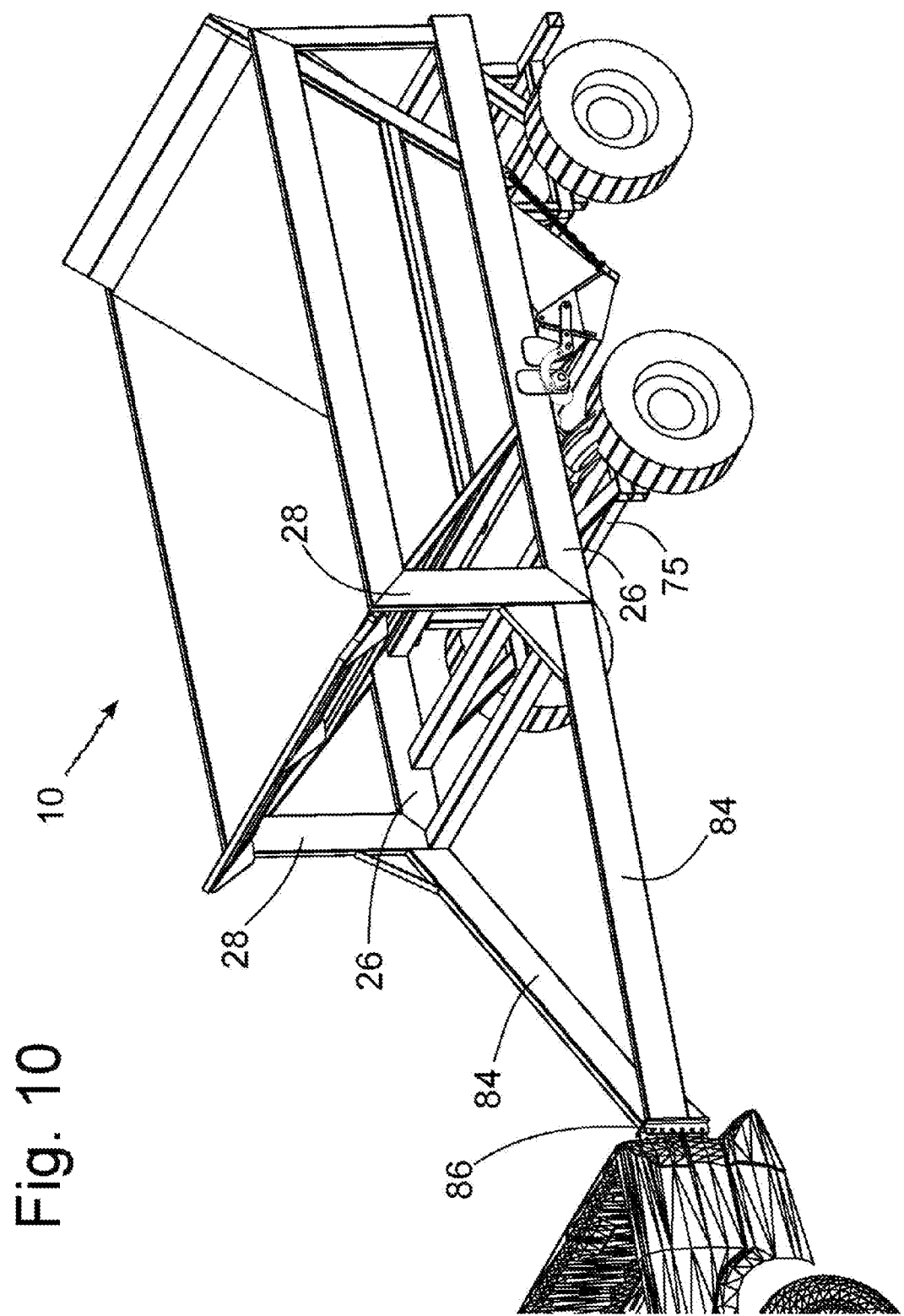
FIG. 10 shows an embodiment of a belly dump trailer with a hitch.

Another embodiment of the belly dump trailer 10 with a bumper pull is shown in FIG. 10. Lower frame members 84 extend from base frame member 26 and side frame members 28 and are angled to meet at a forward part 86. Forward part 86 is shown positioned forward of the forward axle 75. Referring to FIG. 11, trailer coupler 88 may be mounted on forward part 86. As shown in FIG. 11, the hitching mechanism is a tow ball, though any other suitable towing means may also be used. The trailer coupler 88 operates as a bumper pull attachment and is configured to receive a ball hitch 90. The ball hitch 90 is mounted on a towing vehicle, for example, pickup truck 92. A part 94 may be provided to secure coupler 88 to hitch 90.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A belly dump trailer, comprising:
   a hopper having a bottom gate;
   wheels supporting the hopper;
   the bottom gate being hinged to rotate about a horizontal axis between a closed position and an open position;
   a rotary drive for rotating the bottom gate between the closed position and open position;
   the rotary drive being connected to the bottom gate by an over center cam lock formed of pivotally connected link arms comprising a first link arm and a second link arm, in which, in the rotary drive, the first link arm is connected to the bottom gate at a first pivot offset from the horizontal axis and to the second link arm at a second pivot, the closed position of the bottom gate corresponding to the first link arm and the second link arm at a first non-zero angle to each other and forced against a stop, with opening of the bottom gate corresponding to movement of the first link arm and second link arm through a first position, in which first position the first link arm and second link arm are parallel to each other, to a second position, in which second position the first link arm and second link arm are at a second non-zero angle to each other;
   the rotary drive comprising a pair of linear actuators and a drive axle, the second link arm being secured for rotation about a third pivot, and being driven in operation around the third pivot by the pair of linear actuators; and
   the pair of linear actuators being connected by rods to respective off center connections on the drive axle, and the drive axle being connected to drive the second link arm through a third link arm.

2. The belly dump trailer of claim 1, in which the wheels comprise a forward axle and a rearward axle mounted under a base frame member, with the bottom gate between the forward axle and the rearward axle.

3. The belly dump trailer of claim 2, in which the base frame member extends forward of the forward axle and comprises a bumper pull attachment.

4. The belly dump trailer of claim 1, in which a frame of the trailer terminates forwardly in a gooseneck.

5. The belly dump trailer of claim 4, in which the gooseneck comprises a fifth wheel attachment part.

6. The belly dump trailer of claim 5, in which the fifth wheel attachment part comprises a fifth wheel pin depending from the gooseneck.

7. The belly dump trailer of claim 1, in which the rotary drive is remotely controlled.

\* \* \* \* \*